Patented Sept. 22, 1925.

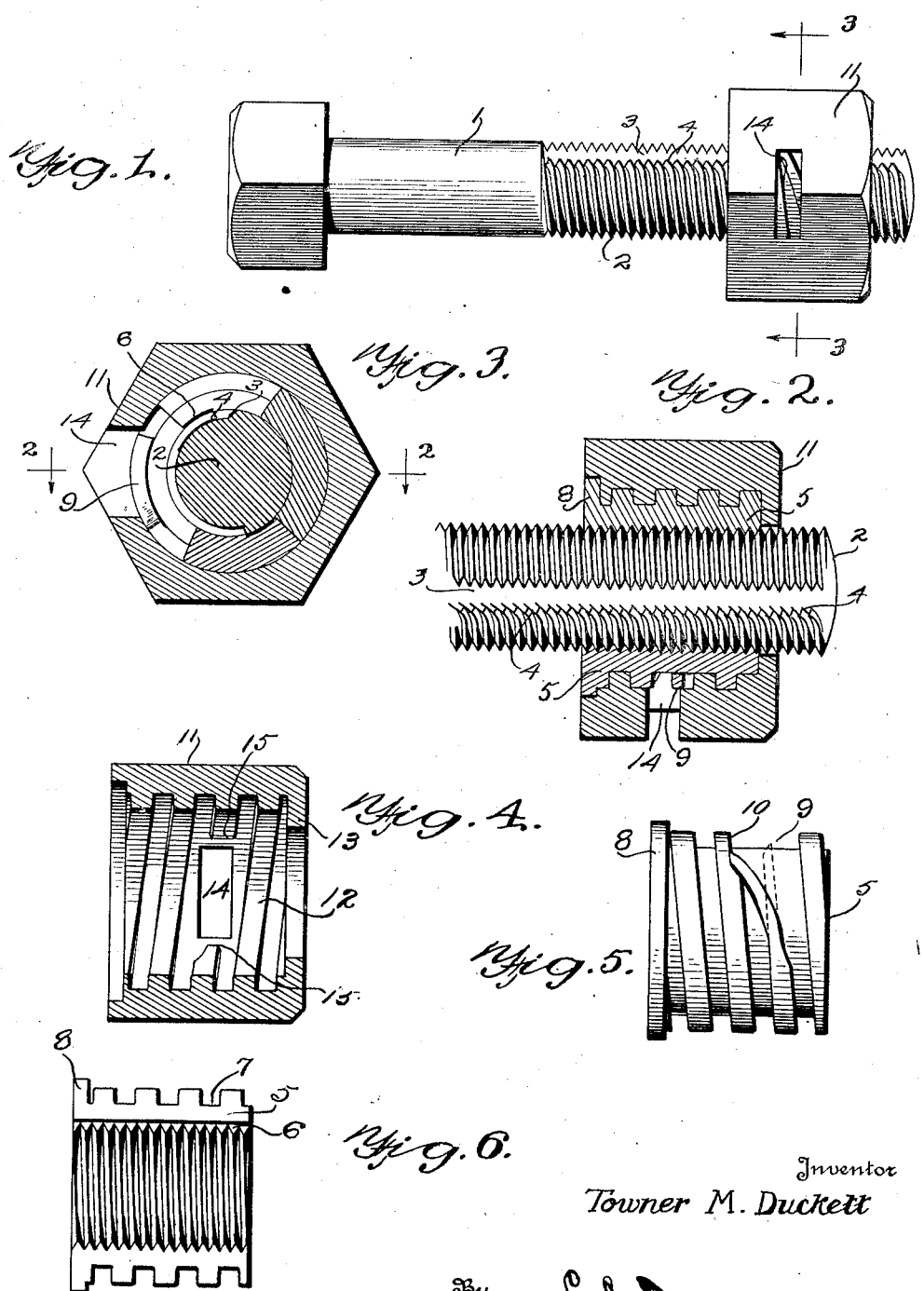

1,554,338

UNITED STATES PATENT OFFICE.

TOWNER M. DUCKETT, OF ADAMSVILLE, ALABAMA.

LOCK NUT.

Application filed August 5, 1925. Serial No. 48,388.

*To all whom it may concern:*

Be it known that I, TOWNER M. DUCKETT, a citizen of the United States, residing at Adamsville, in the county of Jefferson and State of Alabama, have invented certain new and useful Improvements in Lock Nuts, of which the following is a specification.

This invention relates to lock nuts and more particularly to a lock nut in which a sleeve is placed on the bolt and locked in position by the nut and the nut then locked to the sleeve.

An object of the invention is the provision of a device of this character in which the nut is securely locked and may be readily released if desired.

A further object of the invention is the provision of improved means for locking the sleeve in position.

In the accompanying drawings I have shown one embodiment of the invention. In this showing, Figure 1 is a side elevation, Figure 2 is a vertical longitudinal sectional view showing the bolt in elevation, Figure 3 is a transverse sectional view on line 3—3 of Figure 1, Figure 4 is a longitudinal sectional view of the nut, Figure 5 is a side elevation of one-half of the sleeve looking at the interior, and, Figure 6 is a similar view from the exterior.

Referring to the drawings, the reference numeral 1 designates a bolt having a threaded portion 2. The bolt is provided with a slot 3 extending longitudinally of the threaded portion and this slot is under-cut tangentially of the bolt. At one side of the slot the ends of the threads are then bent or extended inwardly of the bolt as indicated at 4.

A sleeve consisting of a pair of semicircular sections 5 is arranged on the bolt and each section of the sleeve is provided with a longitudinally extending groove 6 adjacent one end. The sections of the sleeve are exteriorly threaded as at 7 and the inner end of the sleeve is provided with a peripheral flange 8. As shown one of the threads of the sleeve is cut or separated from the body portion 5 an appreciable distance adjacent one end forming a tooth 9. The tooth 9 is tempered to give it resiliency and is then sprung to the position shown in full lines in Figure 5 of the drawings. The adjacent thread is recessed as at 10 to receive the end of the tooth.

In connection with the bolt and sleeve heretofore described I employ a nut 11 which is internally threaded as at 12 and is provided with an inwardly extending flange or shoulder 13 at its outer end adapted to engage the sleeve when assembled. The nut is provided with a radial opening 14 and adjacent this opening one of the threads is cut away to provide shoulders 15.

In operation, the sleeve is assembled on the bolt at the point to which the nut is to be tightened and the nut then threaded on to the sleeve. When the nut is in position the sleeve is prevented from turning more than a fraction of a revolution as the wall of the groove 6 formed by the adjacent edges of the threads of the sleeve will engage the offset ends 4 of the threads of the bolt. As the nut is tightened on the sleeve, the tooth 9 springs to the dotted line position upon each revolution of the nut to permit the threads of the nut to pass it. When the nut is in position, any attempt to loosen it will cause the tooth to engage one of the shoulders 15 formed by the ends of the cutaway thread and thus prevents further revolution of the nut. To unlock or release the nut, the tooth is retained in the inoperative position shown in dotted lines in Figure 5 of the drawings by inserting a sharp pointed instrument through the opening 14 in the nut and retaining the tooth in this position while the nut is removed.

It is to be understood that the form of my invention herewith shown and described is to be taken as a preferred example of the same and that various changes in the shape, size, and arrangement of parts may be resorted to without departing from the spirit of the invention or the scope of the subjointed claims.

I claim:

1. A nut lock comprising a bolt having a longitudinally extending groove, the ends of the threads on one side of said groove being offset, an internally and externally threaded sleeve adapted to be arranged on said bolt, said sleeve being provided with a longitudinally extending groove adapted to form a shoulder, a nut adapted to be arranged on said sleeve, and means for locking said nut to said sleeve.

2. A nut lock comprising a bolt having a longitudinally extending groove, the ends of the threads on one side of said groove being offset, an internally and externally threaded sleeve adapted to be arranged on said bolt, said sleeve being provided with a longitudinally extending groove adapted to form a shoulder; one of the external threads of said sleeve being separated from the body portion throughout a portion of its length forming a tooth, and a nut adapted to be arranged on said sleeve, one of the threads of the nut being cut away throughout a portion of a revolution to form a stop whereby said tooth may be sprung into a position behind said stop to prevent removal of said nut.

3. A device constructed in accordance with claim 2 wherein said nut is provided with an opening adjacent said cut away portion of said thread to permit the insertion of an instrument to return said tooth to inoperative position.

In testimony whereof I affix my signature.

TOWNER M. DUCKETT.